United States Patent
Yeh et al.

(10) Patent No.: US 10,338,364 B2
(45) Date of Patent: Jul. 2, 2019

(54) LIGHT SOURCE MODULE AND LIGHT SOURCE UNIT

(71) Applicant: Coretronic Corporation, Hsin-Chu (TW)

(72) Inventors: Fang-Ju Yeh, Hsin-Chu (TW);
Chiao-Chih Yang, Hsin-Chu (TW);
Hsin-Hung Lee, Hsin-Chu (TW);
Chi-Lun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/131,058

(22) Filed: Sep. 14, 2018

(65) Prior Publication Data
US 2019/0011685 A1      Jan. 10, 2019

Related U.S. Application Data

(62) Division of application No. 14/791,268, filed on Jul. 3, 2015, now abandoned.

(30) Foreign Application Priority Data

Nov. 25, 2014   (TW) .............................. 103140771 A

(51) Int. Cl.
*G02B 19/00* (2006.01)
*G02F 1/1335* (2006.01)

(52) U.S. Cl.
CPC ..... *G02B 19/0061* (2013.01); *G02B 19/0028* (2013.01); *G02F 1/133603* (2013.01); *G02F 1/133605* (2013.01); *G02F 2001/133607* (2013.01)

(58) Field of Classification Search
CPC ....... G02B 19/0028; G02F 1/133605–133606; G02F 2001/133607
See application file for complete search history.

(56) References Cited

U.S. PATENT DOCUMENTS

| 2013/0088857 A1* | 4/2013 | Lee | G02B 19/0028 362/97.1 |
| 2015/0219966 A1* | 8/2015 | Song | G02B 19/0071 362/97.3 |
| 2015/0268513 A1* | 9/2015 | Chang | G02F 1/133605 362/97.1 |

* cited by examiner

Primary Examiner — Gerald J Sufleta, II
(74) Attorney, Agent, or Firm — JCIPRNET

(57) ABSTRACT

A light source module including at least one optical film and a light source unit is provided. The light source unit is disposed under the at least one optical film, and a space is formed between the light source unit and the at least one optical film. The light source unit includes a plurality of light emitting elements and a plurality of secondary lenses. The light emitting elements are arranged along a direction parallel to the at least one optical film. The secondary lenses are correspondingly disposed on the light emitting elements and each of the secondary lenses has a patterned reflective layer. Each of the secondary lenses has a light hole radius R, a distance between a distribution range of the patterned reflective layer and a bottom of the corresponding secondary lenses is H, and the distribution range of the patterned reflective layer satisfies $1/R < H < 3/2R$

10 Claims, 6 Drawing Sheets

LIGHT SOURCE MODULE AND LIGHT SOURCE UNIT

CROSS-REFERENCE TO RELATED APPLICATION

This application is a divisional application of and claims the priority benefit of a prior application Ser. No. 14/791,268, filed on Jul. 3, 2015. This application claims the priority benefit of Taiwan application serial no. 103140771, filed on Nov. 25, 2014. The entirety of each of the above-mentioned patent application is hereby incorporated by reference herein and made a part of this specification.

BACKGROUND OF THE INVENTION

Field of the Invention

The invention relates to a light source module and a light source unit, and more particularly, relates to a light source module and a light source unit having a secondary lens.

Description of Related Art

Generally, a light emitting diode (LED) is applicable on various lighting devices and various flat-panel displays (e.g., as a light source of a liquid crystal display (LCD)) in daily life.

Take the light emitting diode applied in the liquid crystal display for example. A backlight module of the liquid crystal display is a kind of a planer light source, and a basic principle thereof is to convert an effective light from a linear light source or a point light source into the planar light source with high brightness and favorable uniformity. Generally, according to a position of the light source, the backlight module may be classified into two types, namely a edge type and a direct type. Because a direct type backlight module has a simple structure and may adopt a plurality of light sources for providing higher brightness and luminance, the direct type backlight module is often applied in electronic products such as a large size liquid crystal display.

In order to reduce the number of the light emitting diodes or reduce an optical cavity depth, secondary optical lenses are often disposed in some of the direct type backlight modules nowadays. However, a light diffusion capability of the secondary optical lens, the number of the light emitting diodes and the optical cavity depth are factors that affect the product costs. For instance, when the secondary lens used in the direct type backlight module is a refractive secondary lens, which has an opening angle of ±80° and a distance ratio (i.e., h/p ratio) of an optical cavity depth (h, referring to FIG. 1) to a pitch between the light emitting diodes (p, referring to FIG. 1) approximately 0.25, if the optical cavity depth is 25 mm, the pitch between the light emitting diodes requires approximately 100 mm. As the distance ratio of the optical cavity depth to the pitch between the light emitting diodes is lower, the better light diffusion capability of the secondary lens is required. Therefore, when aforesaid secondary lens is used and the direct type backlight module are to be further miniaturized, in order to maintain the same distance ratio of the optical cavity depth to the pitch between the light emitting diodes, the pitch between the light emitting diodes must be reduced. Accordingly, the number of the light emitting diodes and processing costs for attaching the secondary lens to surfaces of supporting the secondary lens may both be increased. As such, how to provide a favorable uniformity and taste for the direct type backlight module while taking the product costs into consideration is an issue to be solved.

China patent application publication no. CN101153982A discloses a backlight module having a bottom plate, a plurality of light emitting diodes disposed on the bottom plate, and an optical plate disposed above the light emitting diodes. Taiwan patent application publication no. 201411892 discloses a lens and a reflective layer. The lens is disposed on a substrate and covers a light emitting diode chip. The reflective layer is disposed on the lens, and configured to reflect a light ray emitted from a lateral side of the light emitting diode chip. Taiwan patent application publication no. 201027184 discloses a backlight module including a reflective plate, at least one light source and at least one lens. U.S. Pat. No. 6,814,456B1 discloses a light shading sheet, which covers a light source generator, and the light shading sheet includes a plurality of light holes for scattering light.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention is directed to a light source module including advantages of low costs, thin optical cavity and high uniformity.

The invention provides a light source unit having an advantage of high uniformity.

Other objects and advantages of the invention can be further illustrated by the technical features broadly embodied and described as follows.

In order to achieve one or a portion of or all of the objects or other objects, a light source module is proposed according to an embodiment of the invention. The light source module includes at least one optical film and a light source unit. The light source unit is disposed under the at least one optical film, and a space is formed between the light source unit and the at least one optical film. The light source unit includes a plurality of light emitting elements and a plurality of secondary lenses. The light emitting elements are arranged along a direction parallel to the at least one optical film. The secondary lenses are correspondingly disposed on the light emitting elements and each of the secondary lenses has a patterned reflective layer. Each of the secondary lenses has a light hole radius R, a distance between a distribution range of the patterned reflective layer and a bottom of each of the secondary lenses is H, and the distribution range of the patterned reflective layer satisfies $1/3R < H < 3/2R$.

In order to achieve one or a part of or all of the above advantages or other advantages, a light source unit including a light emitting element and a secondary lens is proposed according to an embodiment of the invention. The secondary lens is correspondingly disposed on the light emitting element. The secondary lens has a patterned reflective layer. The secondary lens has a light hole radius R, a distance between a distribution range of the patterned reflective layer and a bottom of the secondary lens is H, and the distribution range of the patterned reflective layer satisfies $1/3R < H < 3/2R$.

In an embodiment of the invention, each of the secondary lenses is a refractive secondary lens, and the patterned reflective layer is disposed on a circumference of an upper surface of the corresponding secondary lens.

In an embodiment of the invention, the distribution range of the patterned reflective layer satisfies 1/3R<H<R.

In an embodiment of the invention, a distance between the distribution range of the patterned reflective layer and a center of the corresponding secondary lens is X, and the distribution range of the patterned reflective layer satisfies 4/5R<X<R.

In an embodiment of the invention, a shape of the patterned reflective layer is a ring shape.

In an embodiment of the invention, the patterned reflective layer has a plurality of openings.

In an embodiment of the invention, the patterned reflective layer has a plurality of irregular patterns, and the irregular patterns are arranged in a manner of surrounding the center of the corresponding secondary lens.

In an embodiment of the invention, each of the secondary lenses is a reflective secondary lens, and the patterned reflective layer covers an upper surface of the corresponding secondary lens.

In an embodiment of the invention, the distribution range of the patterned reflective layer satisfies 1/2R<H<3/2R.

In an embodiment of the invention, the patterned reflective layer is distributed in a range within 2R away from the center of the corresponding secondary lens.

In an embodiment of the invention, the patterned reflective layer is flexible.

In an embodiment of the invention, the patterned reflective layer has at least one opening, and a ratio of an area of the at least one opening to a surface area of the patterned reflective layer is between 20% and 90%.

In an embodiment of the invention, a number of the at least one opening of the patterned reflective layer is plural, and the openings are arranged in a manner of circular symmetry.

In an embodiment of the invention, a number of the at least one opening of the patterned reflective layer is plural, and the openings are irregularly arranged.

In an embodiment of the invention, a reflective index of the patterned reflective layer is between 50% and 100%.

In an embodiment of the invention, the patterned reflective layer is a white reflective layer, a silver reflective layer, an evaporated reflective metal or an ink reflective material.

In an embodiment of the invention, the light source module further includes a diffusion plate located between the at least one optical film and the light source unit.

The embodiments of the invention may achieve at least one of advantages or effects as listed below. By disposing the secondary lens and the patterned reflective layer, the embodiments of the invention may compensate the distribution of the light shape, improve the uniformity for illuminating and reduce a required depth for the optical cavity for thinning of the light source module. In addition, because a volume of the light source module is miniaturized, a cost for the components therein may be reduced. Moreover, while improving the uniformity on the illuminating surface, degrees of freedom for selecting various parts such as the optical film, the diffusion plate, the light emitting element are increased accordingly, so as to further improve the flexibility when performing related optical designs.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
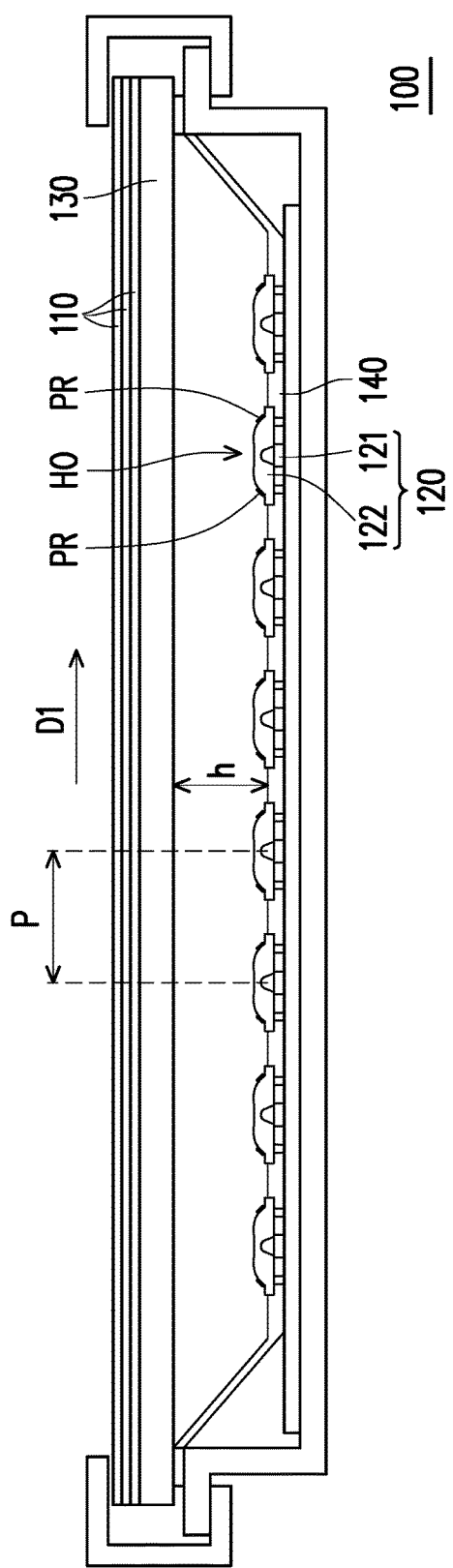
FIG. 1 is a cross-sectional view illustrating a light source module according to an embodiment of the invention.

FIG. 1 is a cross-sectional view illustrating a light source module according to an embodiment of the invention. Referring to FIG. 1, a light source module 100 of the present embodiment includes at least one optical film 110 (three optical films are exemplarily illustrated in FIG. 1), a light source unit 120, and a reflecting unit 140. The light source unit 120 includes a plurality of light emitting elements 121 and a plurality of secondary lenses 122, however, the invention is not limited thereto, and in other embodiments, the light source unit 120 may include one light emitting element 121 and one secondary lens 122. In the present embodiment, the light emitting element 121 is, for example, a light emitting diode (LED), the light source module 100 is, for example, a direct type backlight module, and the reflecting unit 140 is, for example, a white reflecting sheet. In one embodiment, the light source module 100 may further include a diffusion plate 130.

As shown in FIG. 1, in the present embodiment, the light emitting element 121 is disposed on a bottom of the light source module 100, and the light emitting element 121 is disposed, for example, on a substrate (not marked). The substrate is, for example, a circuit board. The secondary lenses 122 are correspondingly disposed on the light emitting elements 121 and the reflecting unit 140 is disposed on the substrate. The light emitting elements 121 are arranged along a direction D1 parallel to the at least one optical film 110. The reflecting unit 140 includes a plurality of holes HO arranged along the direction D1, and the positions of the holes HO are corresponding to each of the light emitting elements 121 and each of the secondary lenses 122 in order to expose each of the light emitting elements 121 and each of the secondary lenses 122. In the present embodiment, each of the secondary lenses 122 is a refractive secondary lens. Generally, the refractive secondary lens may refract an incident light beam twice to generate an emergent light beam with large angle variation, so as to increase a degree of light beam diffusion. In other words, the refractive secondary lens generally provides the maximum value of illumination at an opening angle of ±75° to ±80° (i.e., a maximum brightness is provided at the opening angle of ±75° to ±80°). It is defined that 0° of the opening angle is at a direction perpendicular to the direction D1 and ±90° of the opening angle is at a direction parallel to the direction D1. However, while the light beam is expanded in large angle to obtain wider opening angle for the conventional refractive secondary lens, a center brightness may be suppressed accordingly. As a result, when the light source module 100 has a lower optical cavity, an issue of a center dim spot may arise due to insufficient distance for mixing the light beam. Methods regarding how to dispose a patterned reflective layer PR on an upper surface 122a of the secondary lens 122 in the light source module 100 of the present embodiment in order to accomplish means for compensating a light shape are described below with reference to FIG. 2A.

Figure 2A:
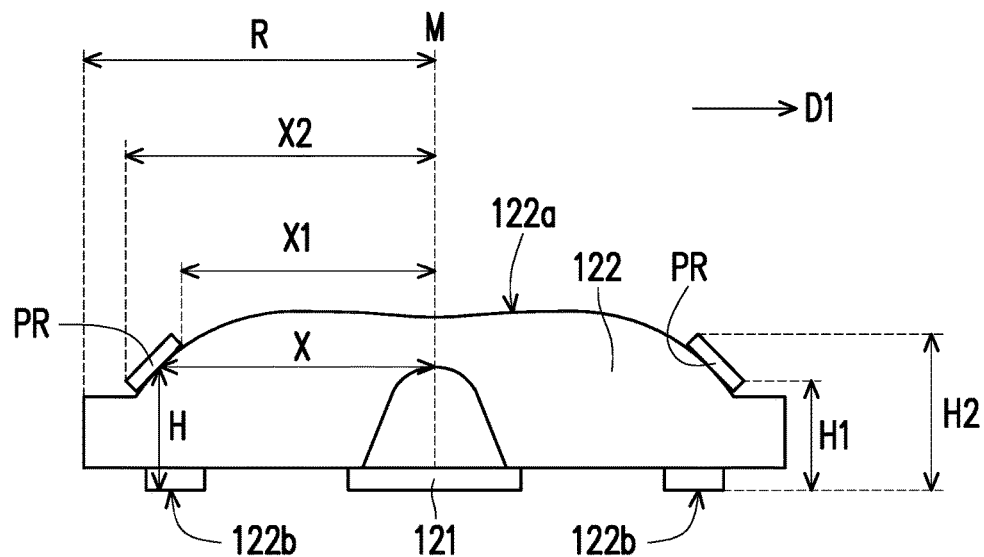
FIG. 2A is a cross-sectional view illustrating the light source unit of FIG. 1.

FIG. 2A is a cross-sectional view illustrating the light source unit of FIG. 1. Referring to FIG. 2A, in the present embodiment, each of the secondary lenses 122 has the patterned reflective layer PR, and the patterned reflective layer PR is disposed on a circumference of the upper surface 122a of each of the secondary lenses 122. The patterned reflective layer PR may be, for example, a white reflective layer or a silver reflective layer and is, for example, adhered on the upper surface 122a of each of the secondary lenses 122. A material of the white reflective layer may be a titanium dioxide ($TiO_2$) or a barium sulfate ($BaSO_4$), but the invention is not limited thereto. In other embodiments, a material of the patterned reflective layer PR may be an evaporated reflective metal (e.g., silver, aluminum, etc.) or an ink reflective material, and may be formed on the upper surface 122a of each of the secondary lenses 122 through manufacturing processes such as vapor deposition, an ink-jet process or a printing process. In one embodiment, a reflective index of the patterned reflective layer PR is exemplarily between 50% and 100%. It should be noted that, aforesaid numerical range is used only for example instead of limiting the invention.

Figure 3C:
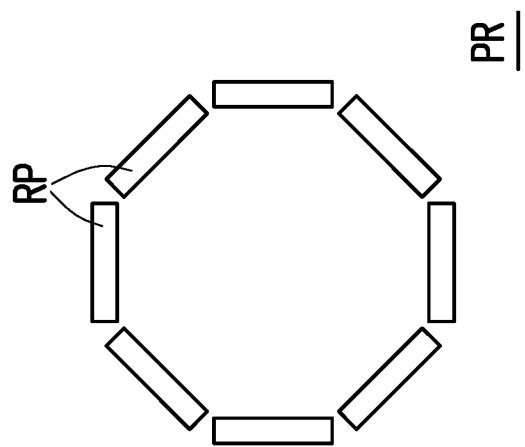
FIG. 3A to FIG. 3C are top views respectively illustrating the different patterned reflective layers of FIG. 1.
Figure 3B:
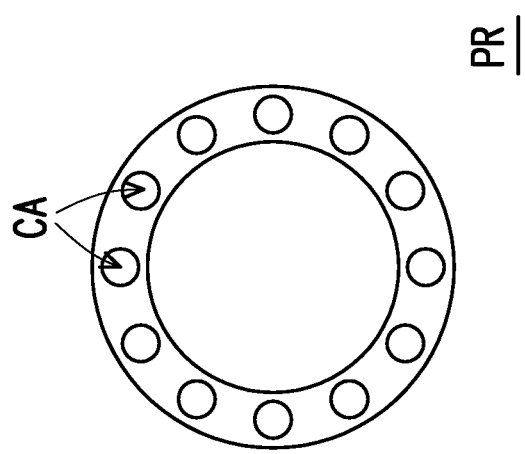
Figure 3A:
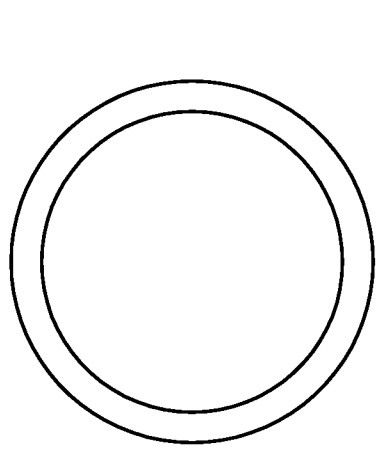

As shown in FIG. 2A, in the present embodiment, each of the secondary lenses 122 has a light hole radius R. The light hole radius R is defined as a radius of the upper surface 122a (illuminating surface) of the secondary lens 122, namely, a half of a length of the upper surface 122a projected on the optical film 110 (referring to FIG. 1) and parallel to the direction D1. A distance between a distribution range of the patterned reflective layer PR and a bottom 122b of each of the secondary lenses 122 is H, and the distribution range of the patterned reflective layer PR satisfies 1/3R<H<3/2R. In one embodiment, distances from two ends of the patterned reflective layer PR to a bottom 122b are a distance H1 and a distance H2, respectively, wherein the distance H1 is equal to 1/3R for example, and the distance H2 is equal to R for example. As such, the distribution range of the patterned reflective layer PR satisfies 1/3R<H<R. In one embodiment, a distance between the distribution range of the patterned reflective layer PR and a center M of each of the secondary lenses 122 is X, and the distribution range of the patterned reflective layer PR satisfies 4/5R<X<R. As shown in FIG. 2A, in one embodiment, distances from two ends of the patterned reflective layer PR to a center M are a distance X1 and a distance X2, respectively, wherein the distance X1 is equal to 4/5R for example, and the distance X2 is less than R for example. As such, the distribution range of the patterned reflective layer PR satisfies 4/5R<X<R. Therefore, the distribution range of the patterned reflective layer PR may be related to the size of the patterned reflective layer PR, the size of the upper surface 122a of the patterned reflective layer PR, and its position on the upper surface 122a of the secondary lens 122 with respect to the center M of the patterned reflective layer PR and/or the bottom 122b of the patterned reflective layer PR. In one embodiment, if the patterned reflective layer PR is in the form of a ring type (as shown in FIG. 3A or FIG. 3B) or is arranged in a ring-like type (as shown in FIG. 3C), the two ends of the patterned reflective layer PR mentioned above are referred to the inner edge and outer edge. In one embodiment, a size of the light hole radius R is between 7.5 mm and 8.5 mm for example, and a size of the distance H between the distribution range of the patterned reflective layer PR and the bottom 122b of each of the secondary lenses 122 is between 6 mm and 8 mm for example. It should be noted that, aforesaid numerical range is used only for example instead of limiting the invention.

Accordingly, parts of the light beam in large angle that is close to edges of the secondary lens 122 may be reflected by the patterned reflective layer PR, and then recycled back to center M of the secondary lens 122 for illuminating, so as to effectively compensate the distribution of the light shape in order to solve the issue of the center dim spot. Take the 32-inch light source module 100 adopting the same secondary lens 122 for example. Before the patterned reflective layer PR of the present embodiment is disposed, a light diffusion capability of the adopted secondary lens 122 provides a distance ratio (h/p ratio) of an optical cavity depth h to a pitch p between the light emitting elements 121 being approximately 0.25. That is, in the condition where the pitch p between the light emitting elements 121 is 85 mm, the reasonable optical cavity depth h should be 21.25 mm. When the patterned reflective layer PR of the present embodiment is disposed, the optical cavity depth h may be reduced to 18 mm. That is, the light diffusion capability of the secondary lens 122 may be improved by disposing the patterned reflective layer PR, such that the distance ratio of the optical cavity depth h to the pitch p between the light emitting elements 121 may be reduced to 0.21. It should be noted that, aforesaid numerical range is used only for example instead of limiting the invention.

Figure 2B:
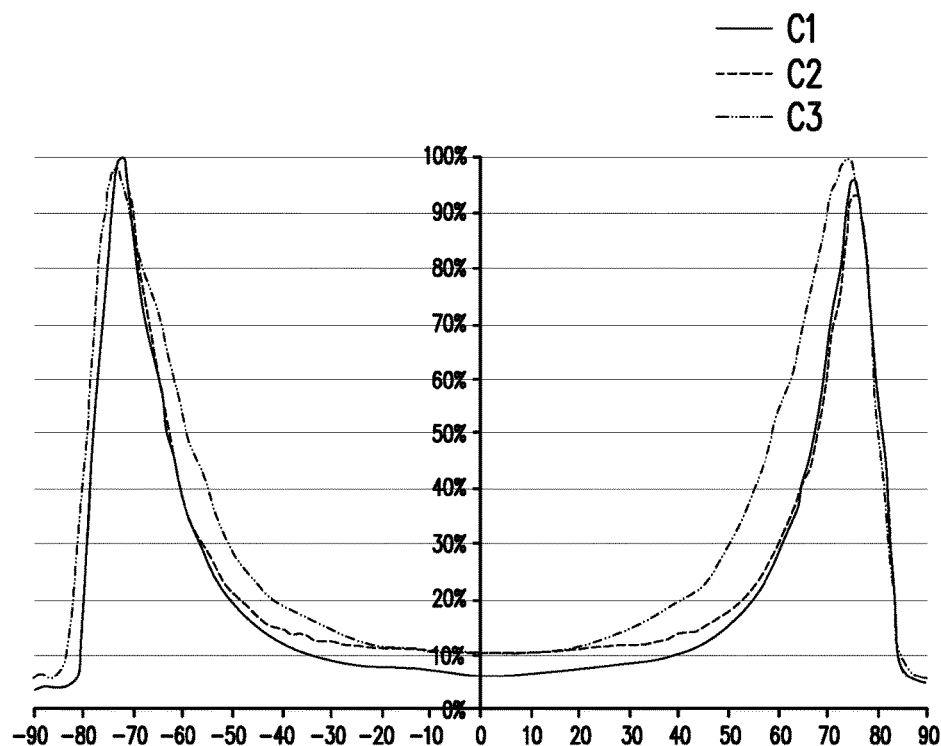
FIG. 2B is a data simulating diagram of lighting distribution curves for the different secondary lenses in the light source module of FIG. 1.

As shown in FIG. 2B, a lighting distribution curve C1 represents the secondary lens 122 not disposed with the patterned reflective layer PR and capable of providing the distance ratio of the optical cavity depth h to the pitch p between the light emitting elements 121 being approximately 0.25; a lighting distribution curve C2 represents the secondary lens 122 disposed with the patterned reflective layer PR and capable of providing the distance ratio of the optical cavity depth h to the pitch p between the light emitting elements 121 being approximately 0.25; and a lighting distribution curve C3 represents another secondary lens not disposed with the patterned reflective layer PR and capable of providing the distance ratio of the optical cavity depth h to the pitch p between the light emitting elements 121 being approximately 0.30. In comparison with the lighting distribution curve C1 of the secondary lens 122 not disposed with the patterned reflective layer PR, the lighting distribution curve C2 of the secondary lens 122 disposed with the patterned reflective layer PR has a higher center brightness to effectively compensate the distribution of the light shape. Further, in comparison with the lighting distribution curve C3 of the another secondary lens not disposed with the patterned reflective layer PR and capable of providing the distance ratio of the optical cavity depth h to the pitch p between the light emitting elements 121 being approximately 0.3, the lighting distribution curve C2 of the secondary lens 122 disposed with the patterned reflective layer PR can still maintain a sharp curve for the distribution of the light shape in large angle, such that most of the light beam may be emitted in large angle. It should be noted that, aforesaid numerical range is used only for example instead of limiting the invention.

Referring back to FIG. 1, the light source unit 120 is disposed under the at least one optical film 110, and a space is formed between the at least one optical film 110 and the reflecting unit 140 to form an optical cavity of the light source module 100. In addition, a diffusion plate 130 is located between the at least one optical film 110 and the light source unit 120.

Referring to FIG. 1, in one embodiment, the reflecting unit 140 and the diffusion plate 130 are disposed on a transmitting path of the light beam from the light source unit 120, and the light source units 120 are distributed on one side of the diffusion plate 130 (i.e. the light source units 120 are disposed under the diffusion plate 130). Specifically, when the light beam is emitted from the secondary lens 122, the light beam is transmitted to the diffusion plate 130. When the light beam is transmitted to the diffusion plate 130, the light source module 100 may uniform the distribution of light beams through the diffusion plate 130, and adjust an illuminating direction through the optical film 110, so as to enhance a forward luminance of the light source module 100.

Accordingly, by disposing the secondary lens 122 and the patterned reflective layer PR, the embodiments may compensate the distribution of the light shape, improve the uniformity for illuminating and reduce a required depth for the optical cavity for thinning of the light source module 100. In addition, because a volume of the light source module 100 is miniaturized, costs for mechanical members may be reduced accordingly. Moreover, while improving the uniformity on the illuminating surface, degrees of freedom for selecting various parts such as the optical film 110, the diffusion plate 130 and the light emitting element 121 may increase accordingly, so as to further improve the flexibility when performing related optical designs.

Embodiments regarding shapes of the patterned reflective layer PR are described below with reference to FIG. 3A to FIG. 3C.

FIG. 3A to FIG. 3C are top views respectively illustrating the different patterned reflective layers of FIG. 1. For instance, as shown in FIG. 3A, in the present embodiment, a shape of the patterned reflective layer PR may be a ring shape. In other embodiments, the patterned reflective layer PR may include a plurality of openings CA (as shown in FIG. 3B), or include a plurality of irregular patterns RP. The irregular patterns RP are arranged in a manner of surrounding the center of the secondary lens 122 (as shown in FIG. 3C), however, the invention is not limited thereto. Persons of ordinary skill in the art may adopt the patterned reflective layer PR with suitable patterns based on actual requirements (e.g., simplifying the manufacturing process), which are omitted hereinafter.

Figure 4:
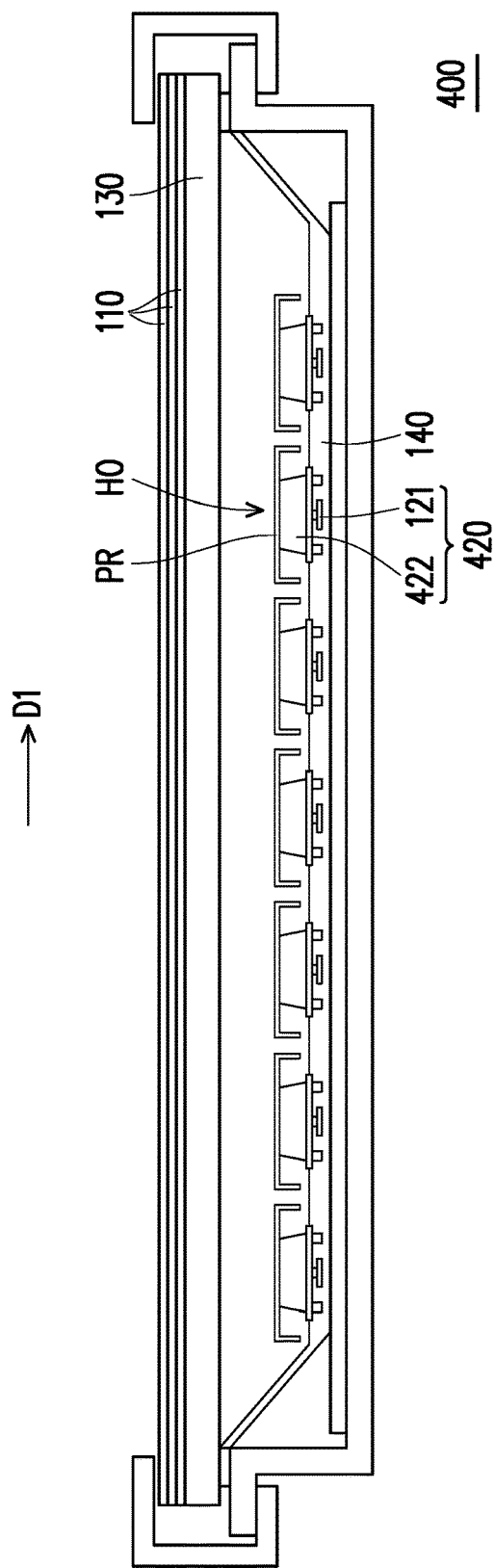
FIG. 4 is a cross-sectional view illustrating a light source module according to another embodiment of the invention.
Figure 5:
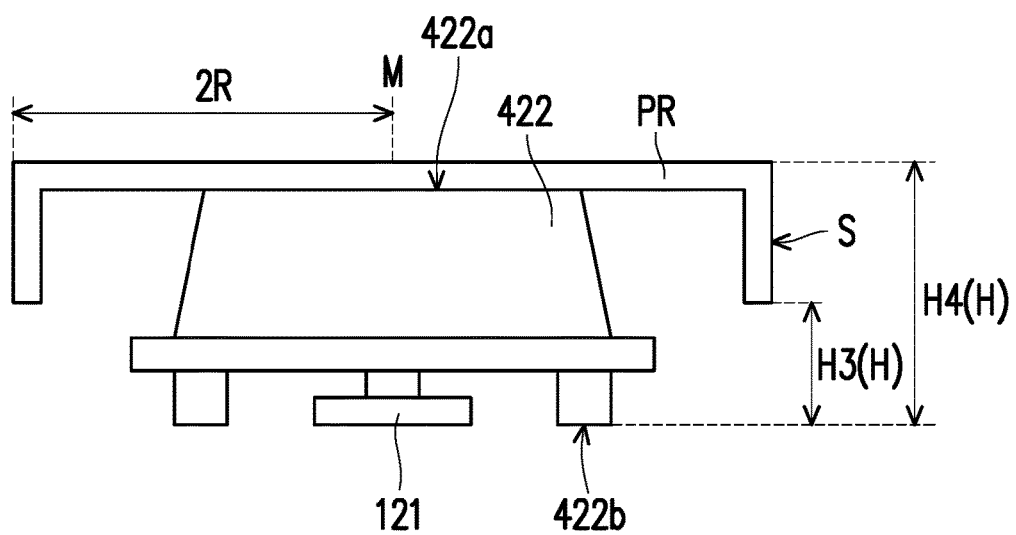
FIG. 5 is a cross-sectional view illustrating the light source unit of FIG. 4.

FIG. 4 is a cross-sectional view illustrating a light source module according to another embodiment of the invention. FIG. 5 is a cross-sectional view illustrating the light source unit of FIG. 4. Referring to FIG. 4 and FIG. 5, a light source module 400 and a secondary lens 422 of the present embodiment are similar to the light source module 100 and the secondary lens 122 of FIG. 1, and their differences are described as follows. In the present embodiment, each of the secondary lenses 422 of a light source unit 420 is a reflective secondary lens. Generally, the reflective secondary lens achieves the purpose of expanding the angle for the emergent light by utilizing a total reflection of the incident light beam in the reflective secondary lens. In other words, the reflective secondary lens generally provides the maximum value of illumination at an opening angle of ±80° to ±100°, especially it may provide more than 50% brightness at an opening angle of ±90°. However, a part of the light beam in the emergent light emerges from a horizontal side of the secondary lens in larger angle. When a stray light is reflected back to a center of the secondary lens 422, a bright spot phenomenon is likely to occur at the center of the secondary lens. Methods regarding how to dispose the patterned reflective layer PR on an upper surface 422a of the secondary lens 422 in the light source module 400 of the present embodiment in order to compensate a light shape are described as follows.

Take one of secondary lenses 422 as illustration. As shown in FIG. 5, the patterned reflective layer PR covers the upper surface 422a of each of the secondary lenses 422. The patterned reflective layer PR is flexible, such that a lateral side S of the patterned reflective layer PR may be bent downwardly or bent upwardly. The light shape of the light emitting element 121 reflected by the secondary lens 422 may be distributed differently in horizontal or vertical directions. Therefore, by adjusting the lateral side S of the patterned reflective layer PR to reflect the light beams from different directions, the light shape in the horizontal or vertical directions may be adjusted in order to obtain the desired light shape.

As shown in FIG. 5, in the present embodiment, a distance between a distribution range of the patterned reflective layer PR and a bottom 422b of each of the secondary lenses 422 is H and the distribution range of the patterned reflective layer PR satisfies 1/3R<H<3/2R. As shown in FIG. 5, in the present embodiment, distances from two ends (e.g. the end of the lateral side S and the top surface of the patterned reflective layer PR respectively) of the patterned reflective layer PR to a bottom 422b are a distance H3 and a distance H4, respectively, wherein the distance H3 is equal to 1/2R for example, and the distance H4 is equal to 3/2R for example. As such, the distribution range of the patterned reflective layer PR satisfies 1/2R<H<3/2R. Further, in one embodiment, the patterned reflective layer PR is distributed in a range within 2R away from the center M of the secondary lens 422. In one embodiment, a size of the light hole radius R is between 6 mm and 8.5 mm for example, and a size of the distance H between the distribution range of the patterned reflective layer PR and the bottom 422b of the secondary lens 422 is between 6 mm and 8 mm for example. It should be noted that, aforesaid numerical range is used only for example instead of limiting the invention.

Accordingly, the uniformity for illuminating may be effectively improved and a required depth for the optical cavity may be reduced for thinning of the light source module. For instance, take the light source module 400 which adopts the reflective secondary lens 422 with the optical cavity of 15 mm for example, when the optical cavity depth is reduced to 12.5 mm, the bright spot would occur. After the patterned reflective layer PR of the present embodiment is disposed, the uniformity for illuminating may be effectively improved to eliminate the bright spot.

Figure 6A:
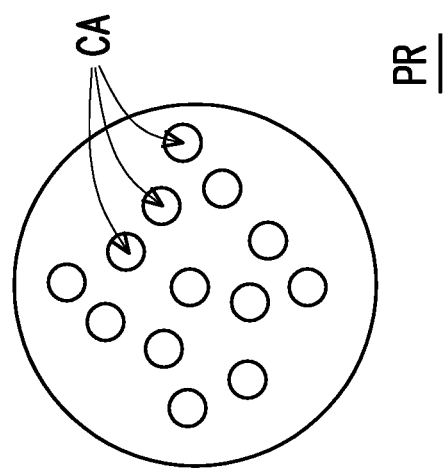
FIG. 6A to FIG. 6B are top views respectively illustrating the different patterned reflective layers of FIG. 4.
Figure 6B:
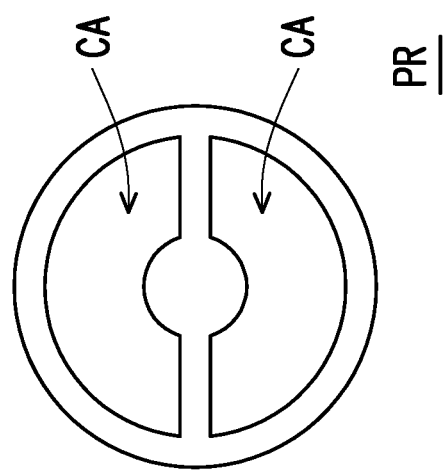

FIG. 6A and FIG. 6B are top views respectively illustrating the different patterned reflective layers of FIG. 4. In the present embodiment, the patterned reflective layer PR has at least one opening CA, and a ratio of an area of the at least one opening CA to a surface area of the patterned reflective layer PR is between 20% and 90%. As shown in FIG. 6A, in the present embodiment, the number of the at least one opening CA of the patterned reflective layer PR is plural (two openings CA are illustrated in FIG. 6A for example), and the openings CA are arranged in a manner of circular symmetry, but the invention is not limited thereto. In other embodiments, the openings CA of the patterned reflective layer PR may be irregularly arranged (as shown in FIG. 6B). Persons of ordinary skill in the art may adopt the patterned reflective layer PR with suitable patterns based on actual requirements (e.g., simplifying the manufacturing process), which are omitted hereinafter. In the present embodiment, in addition to being formed on the secondary lens 422 by using manufacturing processes such as evaporation, coating or printing processes, the patterned reflective layer PR may be manufactured as a three-dimensional structure in order to solve an issue that images can still not be improved even after a surface treatment is performed on the secondary lens 422.

Because a volume of the light source module 400 is miniaturized, costs for mechanical members may be reduced accordingly. Moreover, while improving the uniformity on the illuminating surface, degrees of freedom for selecting various parts such as the optical film 110, the diffusion plate 130 and the light emitting element 121 may also increase accordingly, so as to further improve the flexibility when performing related optical designs. In addition, the light source module 400 may improve the uniformity for illuminating and the forward luminance of the light source module 400 by disposing the diffusion plate 130 and the optical film 110. Therefore, the light source module 400 may achieve similar effects and advantages of the light source module 100, which are not repeated hereinafter.

The embodiments of the invention may achieve at least one of advantages or effects as listed below. By disposing the secondary lens and the patterned reflective layer, the embodiments of the invention may compensate the distribution of the light shape, improve the uniformity for illuminating and reduce a required depth for the optical cavity for thinning of the light source module. In addition, because a volume of the light source module is miniaturized, a cost for the components therein may be reduced. Moreover, while improving the uniformity on the illuminating surface, degrees of freedom for selecting various parts such as the optical film, the diffusion plate, the light emitting element are also increased accordingly, so as to further improve the flexibility when performing related optical designs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Furthermore, these claims may refer to use "first", "second", etc. following with noun or element. Such terms should be understood as a nomenclature and should not be construed as giving the limitation on the number of the elements modified by such nomenclature unless specific number has been given.

What is claimed is:
1. A light source module, comprising:
at least one optical film; and
a light source unit, disposed under the at least one optical film, a space being formed between the light source unit and the at least one optical film, and the light source unit comprising:
a plurality of light emitting elements, arranged along a direction parallel to the at least one optical film; and a plurality of secondary lenses, correspondingly disposed on the light emitting elements, and each of the secondary lenses having a patterned reflective layer, wherein each of the secondary lenses is a reflective secondary lens, and the patterned reflective layer only covers an upper surface of the corresponding secondary lens, and wherein each of the secondary lenses has a light hole radius R, a distance between a distribution range of the patterned reflective layer and a bottom of the corresponding secondary lens is H, and the distribution range of the patterned reflective layer satisfies $1/3R < H < 3/2R$.

2. The light source module of claim 1, wherein the distribution range of the patterned reflective layer satisfies $1/2R < H < 3/2R$.

3. The light source module of claim 1, wherein the patterned reflective layer is distributed in a range within 2R away from the center of the corresponding secondary lens.

4. The light source module of claim 1, wherein the patterned reflective layer is flexible.

5. The light source module of claim 1, wherein the patterned reflective layer has at least one opening, and a ratio of an area of the at least one opening to a surface area of the patterned reflective layer is between 20% and 90%.

6. The light source module of claim 5, wherein a number of the at least one opening of the patterned reflective layer is plural, and the openings are arranged in a manner of circular symmetry.

7. The light source module of claim 5, wherein a number of the at least one opening of the patterned reflective layer is plural, and the openings are irregularly arranged.

8. A light source module, comprising:
at least one optical film; and
a light source unit, disposed under the at least one optical film, a space being formed between the light source unit and the at least one optical film, and the light source unit comprising:
a plurality of light emitting elements, arranged along a direction parallel to the at least one optical film; and
a plurality of secondary lenses, correspondingly disposed on the light emitting elements, and each of the secondary lenses having a patterned reflective layer, wherein each of the secondary lenses is a refractive secondary lens, the patterned reflective layer is disposed only on a circumference of an upper surface of the corresponding secondary lens, and the patterned reflective layer has a ring profile, and
wherein each of the secondary lenses has a light hole radius R, a distance between a distribution range of the patterned reflective layer and a bottom of the corresponding secondary lens is H, and the distribution range of the patterned reflective layer satisfies $1/3R < H < 3/2R$.

9. The light source module of claim 8, wherein the patterned reflective layer has a plurality of openings located in the ring profile.

10. The light source module of claim 8, wherein the patterned reflective layer has a plurality of irregular patterns, and the irregular patterns are arranged in a manner of surrounding the center of the corresponding secondary lens to form the ring profile.

* * * * *